United States Patent Office 3,804,822
Patented Apr. 16, 1974

3,804,822
DIARYLSELENOCARBAZONE COMPOUNDS
John Kazan, Jr., Somerville, N.J., assignor to American Cyanamid Company, Stamford, Conn.
No Drawing. Continuation-in-part of application Ser. No. 853,506, Aug. 27, 1969, now Patent No. 3,575,872, dated Apr. 20, 1971. This application Jan. 27, 1971, Ser. No. 110,334
Int. Cl. C07c 107/00
U.S. Cl. 260—149  2 Claims

ABSTRACT OF THE DISCLOSURE

A new class of diarylselenium compounds are provided which have the following general formula:

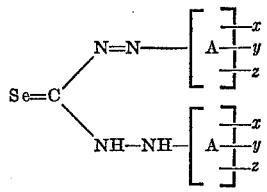

wherein A is an aryl radical containing from 6 to about 12 carbon atoms and $x$, $y$ and $z$ are individually selected from the group consisting of hydrogen, lower alkyl, hydroxy, halo, nitro, amino, di-lower alkylamino or phenylazo.

CROSS REFERENCE TO A RELATED PATENT APPLICATION

This application is a continuation-in-part of U.S. application Ser. No. 853,506, filed on Aug. 27, 1969, issued as U.S. Pat. No. 3,575,872 on Apr. 20, 1971.

Generally stated the subject matter of the present invention relates to a new class of selenium compounds. More particularly, the invention relates to a new class of diarylselenium compounds which find utility as intermediates in the preparation of particular photochromic selenocarbazonate compounds.

BACKGROUND OF THE INVENTION

Photochromic compounds have heretofore been applied to or incorporated in various substrates to render said materials photochromic. For example, polymers containing a measurable quantity of photochromic compound change color upon exposure to visible radiation. This color change is believed to follow from the transformation of the photochromic compound from a stable form to a meta-stable form. When the source of radiation is removed, the compound returns from the meta-stable to the stable form and reverts to its original color. Materials of this type are useful in obtaining unique camouflage, design, and novelty effects. Many photochromic compositions heretofore available have met with limited acceptance because of their relatively slow rates of conversion by light into their meta-stable form (highly colored forms) and/or their slow rate of return to their stable (original color) form.

The advent of a new class of selenium photochromic compounds; namely, the 1,5-diarylselenocarbazonates and the metal complexes of 1,5-diarylselenocarbazonates, has resulted in filling a long standing need.

The present invention represents the culmination of a series of investigations conducted largely by the inventor and his associates, directed to the preparation of such new photochromic compounds.

It is a primary object of the invention then to provide precursors or intermediates to such photochromic compounds.

Additional objects and advantages of the invention will be set forth in part in the description which follows and in part will be obvious from the description, or may be realized by practice of the invention, the objects and advantages being realized and attained by means of the methods, processes, instrumentalities and combinations particularly pointed out in the appended claims.

THE INVENTION

To achieve the foregoing object, and in accordance with its purpose, as embodied and broadly described, the present invention relates to a diarylselenium compound of the formula:

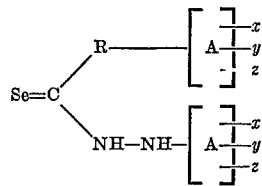

wherein R is N=N— or NH—NH—, A is an aryl radical containing from 6 to about 12 carbon atoms and $x$, $y$ and $z$ are individually selected from the group consisting of hydrogen, lower alkyl, hydroxy, halo, nitro, amino, di-lower alkylamino or phenylazo.

The invention consists of the novel materials and processes herein shown and described. In addition, it should also be understood that both the foregoing general description and the following detailed description are exemplary and explanatory and are not restrictive of the invention.

The 1,5-diarylselenocarbazones (I) intermediates can readily be prepared by heating the corresponding 2-arylhydrazonium 3-aryldiselenocarbazates (II) to form the corresponding diarylselenocarbazides (III) which can be readily oxidized to the diarylselenocarbazones (I). This can be illustrated by the following equation:

(1)
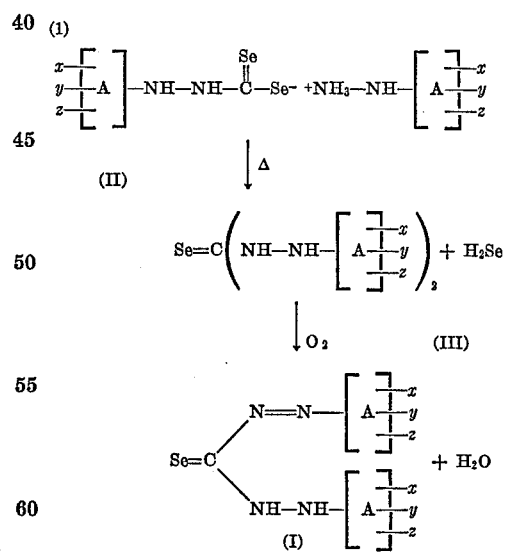

The 2-arylhydrazonium 3-aryldiselenocarbazates (II) can be prepared by reacting the corresponding arylhydrazine (IV) with carbon diselenide. This can be illustrated by the following Equation 2:

(2)
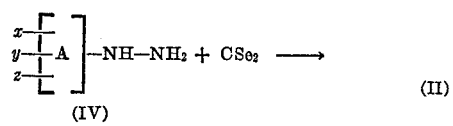

Representative arylhydrazines (IV) which can be employed include phenylhydrazine, p-tolylhydrazine, 2,4-xylylhydrazine, 1-naphthylhydrazine, 2-naphthylhydrazine, p-nitrophenylhydrazine, m-methoxyphenylhydrazine, p-chlorophenylhydrazine, 1 - bromo-2-naphthylhydrazine, p-hydrazinobenzoic acid, p-hydrazino-N,N-dimethylbenzamide, 4'-hydrazinoacetanilide and the like.

The arylhydrazine and carbon diselenide can be reacted in stoichiometric amounts in a suitable inert solvent such as dichloromethane or absolute ethanol. The reaction temperature can range from about 0° to about 30° C. The 2-arylhydrazonium 3-aryldiselenocarbazates (II) can be isolated by conventional procedures.

The conversion of the 2-arylhydrazonium 3-aryldiselenocarbazate (II) to the corresponding selenocarbazide (III) can be conveniently effected by heating the hydrazonium salt. This can be done by refluxing a solution of the hydrazonium salt in a suitable inert solvent, such as ethyl acetate or carbon tetrachloride, until there is no further evolution of hydrogen selenide. Purification of the crude product is unnecessary before carrying out the conversion of said selenocarbazide to the 1,5-diarylselenocarbazone (I). It is considered preferable, however, to remove the solvent before proceeding with the conversion to the 1,5-diarylselenocarbazone.

The diarylselenocarbazide (III) can be converted to the 1,5-diarylselenocarbazone (I) by oxidation with atmospheric oxygen in an alkaline medium. The oxidation can be conveniently accomplished by adding an alkali, such as for example potassium hydroxide, sodium hydroxide, lithium hydroxide and the like, and an inert solvent, such as ethanol, methanol and the like, to the selenocarbazide, followed by agitation in the presence of atmospheric oxygen at a low temperature, e.g., —50° to about —10° C. The resulting 1,5-diarylselenocarbazone can be isolated by adding the reaction mixture to an aqueous mineral acid to precipitate the product. The product can be recovered by filtering or other conventional techniques.

The following examples are provided for illustrative purposes and may include particular features of the invention. However, the examples should not be construed as limiting the invention, many variations of which are possible without departing from the spirit or scope thereof.

EXAMPLE I

Preparation of 2-phenylhydrazonium 3-phenyldiselenocarbazate

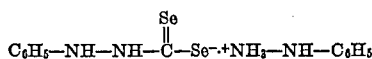

A solution of 3.4 g. carbon diselenide in 90 g. dichloromethane is slowly added to a solution of 11.0 g. phenylhydrazine in 350 g. dichloromethane. After the mixture is stirred for an additional 1–2 hours, the resulting crystalline precipitate is separated by filtration and washed with dichloromethane. The product melts at about 67° C. with decomposition.

Calc. for $C_{13}H_{16}N_4Se_2$ (percent): C, 40.4; H, 4.17; N, 14.5; Se, 40.8. Found (percent): C, 40.1; H, 4.15; N, 14.8; Se, 40.0.

When the procedure is repeated substituting for the phenylhydrazine equivalent amounts of p-tolylhydrazine, 2-naphthylhydrazine, p-nitrophenylhydrazine, p-fluorophenylhydrazine or 4-hydrazinoacetanilide, the products obtained are 2-p-tolylhydrazonium 3-p-tolyldiselenocarbazate,
2-(2-naphthyl) hydrazonium 3-(2-naphthyldiselenocarbazate,
2-p-nitrophenylhydrazonium 3-p-nitrophenyldiselenocarbazate,
2-p-fluorophenylhydrazonium 3-p-fluorophenyldiselenocarbazate, and
2-p-acetamidophenylhydrazonium 3-p-acetamidophenyldiselenocarbazate, respectively.

EXAMPLE II

Preparation of 1,5-diphenylselenocarbazone

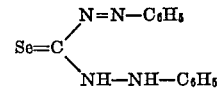

A solution of 3.0 g. 2 - phenylhydrazonium 3-phenyldiselenocarbazate (product of Example 1) in 150 ml. ethyl acetate is refluxed until the evolution of hydrogen selenide has ceased. The solution is cooled and filtered, and the solvent is removed by evaporation. The resulting brown oil is stirred for about one hour at —10° C. with 50 ml. 10% solution of potassium hydroxide in methanol, and the red mixture is poured into 200 ml. 2 N sulfuric acid, and saturated with sodium chloride at —5° C. The precipitate is separated by filtration, washed with water and dried at room temperature. The material is extracted in a Soxhlet apparatus with pentane. The product is obtained from the pentane as a brown solid melting at 65–70° C. with decomposition.

Calc. for $C_{13}H_{12}N_4Se$ (percent): C, 51.5; H, 3.99; N, 18.5; Se, 26.0. Found (percent): C, 51.5; H, 4.10; N, 17.4; Se, 26.2.

When the above procedure is repeated substituting for the 2 - phenylhydrazonium 3 - phenyldiselenocarbazate equivalent amounts of 2 - p - tolylhydrazonium 3 - p-tolylselenocarbazate, 2 - (2 - naphthyl) hydrazonium 3 - (2 - naphthyl) diselenocarbazate, 2 - p - nitrophenylhydrazinium 3 - p - nitrophenyldiselenocarbazate, 2-p-fluorophenylhydrazonium 3 - p - fluorophenyldiselenocarbazate or 2 - p - acetamidophenylhydrazonium 3-p-acetamidophenyldiselenocarbazate, the products obtained are 1,5-di-p - tolylselenocarbazone, 1,5 - di - (2 - naphthyl) selenocarbazone, 1,5 - di - p - nitrophenylselenocarbazone, 1,5 - di - p - fluorophenylselenocarbazone and 1,5-di-p-acetamidophenylselenocarbazone, respectively.

What is claimed is:

1. A diarylselenium compound of the formula:

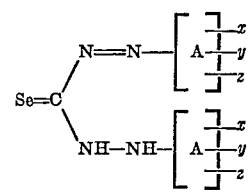

wherein A is aryl containing from 6 to 12 carbon atoms and x, y and z are individually selected from the group consisting of hydrogen, lower alkyl, halo and nitro.

2. The diarylselenocarbazone 1,5-diphenylselenocarbazone.

References Cited

UNITED STATES PATENTS 3,359,254  12/1967  Kazan _____ 260—149
3,575,872  4/1971   Kazan _____ 260—193 X

OTHER REFERENCES

Heilbron: Dictionary of Organic Compounds, vol. 3, New York, Oxford University Press, 1965, pp. 1277 and 1298.

LEWIS GOTTS, Primary Examiner

C. F. WARREN, Assistant Examiner

U.S. Cl. X.R.

260—145 C, 148, 569

UNITED STATES PATENT OFFICE
CERTIFICATE OF CORRECTION

Patent No. 3,804,822          Dated April 16, 1974

Inventor(s) John Kazan, Jr.

It is certified that error appears in the above-identified patent and that said Letters Patent are hereby corrected as shown below:

Col. 1, line 64: "1,5-diarylselenocarbazonates" should read -- 1,5-diarylselenocarbazones --.

Col. 4, line 35: "drazinium" should read -- drazonium --

Signed and sealed this 10th day of September 1974.

(SEAL)
Attest:

McCOY M. GIBSON, JR.
Attesting Officer

C. MARSHALL DANN
Commissioner of Patents